United States Patent [19]
Wilke et al.

[11] Patent Number: 6,073,652
[45] Date of Patent: Jun. 13, 2000

[54] PILOT SOLENOID CONTROL VALVE WITH INTEGRAL PRESSURE SENSING TRANSDUCER

[75] Inventors: Raud A. Wilke, Dousman; Xiaolong Yang, Germantown, both of Wis.; Brian Clifton, Stockport, United Kingdom

[73] Assignee: HUSCO International, Inc., Waukesha, Wis.

[21] Appl. No.: 09/283,784

[22] Filed: Apr. 1, 1999

[51] Int. Cl.⁷ .................... F15B 13/043; F16K 31/124
[52] U.S. Cl. .................... 137/596.16; 91/446; 91/454; 251/30.04
[58] Field of Search ................ 91/446, 454; 137/596.16; 251/30.04

[56] References Cited

U.S. PATENT DOCUMENTS

| | | |
|---|---|---|
| 3,954,046 | 5/1976 | Stillhard . |
| 4,679,765 | 7/1987 | Kramer et al. . |
| 5,878,647 | 3/1999 | Wilke et al. . |

Primary Examiner—Gerald A. Michalsky
Attorney, Agent, or Firm—Quarles & Brady LLP; George E. Haas

[57] ABSTRACT

A pilot operated control valve has a main poppet which selectively engages a valve seat to control flow of fluid between an inlet and an outlet. The flow of fluid through a pilot passage in the main poppet is controlled by a pilot poppet that has a pressure balancing stem extending into the pilot passage. The control valve incorporates a compression check valve and/or a reverse flow check valve, in addition to a transducer for sensing the pressure at the outlet.

16 Claims, 3 Drawing Sheets

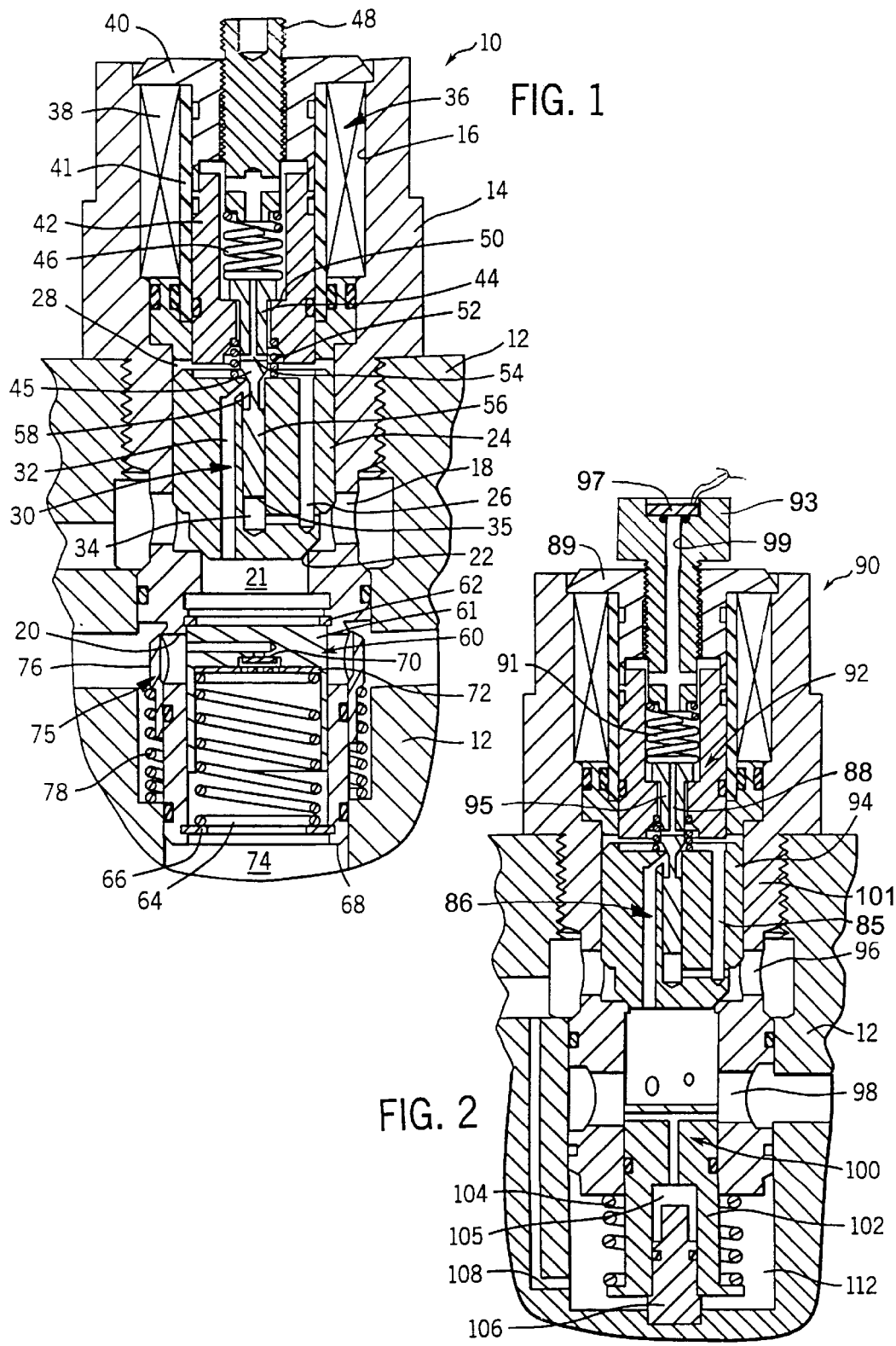

PILOT SOLENOID CONTROL VALVE WITH INTEGRAL PRESSURE SENSING TRANSDUCER

BACKGROUND OF THE INVENTION

The present invention relates to pilot operated hydraulic valves, and more particularly to hydraulic control systems which incorporate such valves along with safety valves.

Construction machinery have moveable members which are operated by a hydraulic cylinder and piston arrangement. The cylinder is divided into two internal chambers by the piston and selective application of hydraulic fluid under pressure to one of the chambers moves the piston in a corresponding direction.

Application of hydraulic fluid to the cylinder typically is controlled by a manual valve, such as the one described in U.S. Pat. No. 5,579,642. In this type of valve, a manual operator lever was mechanically connected to a spool within the valve. Movement of the spool into various positions with respect to cavities in the valve body enables pressurized hydraulic fluid to flow from a pump to one of the cylinder chambers and be drained from the other chamber. By varying the degree to which the spool was moved, the rate of flow into the associated chamber can be varied, thereby moving the piston at proportionally different speeds.

There is a current trend with respect to construction equipment away from manually operated hydraulic valves toward electrically controlled devices that use solenoid valves. This type of control simplifies the hydraulic plumbing as the control valves do not have to be located in the operator cab. This change in technology also facilitates computerized control of various machine functions.

Solenoid valves are well known for controlling the flow of hydraulic fluid and employ an electromagnetic coil which moves an armature in one direction to open a valve. Either the armature or a valve member is spring loaded so that the valve closes when the current is removed from the solenoid coil. As a result, solenoids conventionally are not used to operate a standard valve spool which requires proportional movement in two directions in order to raise and lower a hydraulic cylinder at controlled rates.

Instead, systems have been devised which utilize a pair of solenoid operated valves for each cylinder chamber to be power driven. For a given cylinder chamber, one solenoid valve controls the application of fluid under pressure from a pump to move the piston in one direction, and the other solenoid valve is alternatively opened to drain the fluid from the chamber to a reservoir tank to move the piston in the opposite direction. Thus, if both chambers of a cylinder chambers are to be power driven, four such solenoid valves are required, two supply valves and two drain valves.

The degree to which the valve opens determines the hydraulic pressure at the output port and ideally is proportional to the electric current applied to the solenoid. However, a number of factors, such as load force, valve age and supply pressure, affect the actual pressure produced at any given open position of the valve. Therefore, it is desirable to be able to sense the pressure and produce an electrical signal representative of that sensed pressure. That signal can be used as a feedback signal to the circuit that controls the current to the solenoid. The obvious approach to sensing the pressure would be to provide a pair of ports, one for each output port, in the valve housing at which to attach a pair of pressure sensors. However, that requires additional machining and increased leak potential.

SUMMARY OF THE INVENTION

An object of the present invention is to provide a solenoid operated pilot valve for proportionally controlling the flow of hydraulic fluid.

Another object is to integrate a pressure sensing transducer into the solenoid operated pilot valve.

A further object is to provide a pressure balancing mechanism for the pilot valve.

Yet another object of the present invention is to incorporate check valves into the structure of such a solenoid operated valve, thereby eliminating a need for separate check valves and reducing the size of a fluid control system.

A still further object is to provide such a solenoid operated pilot valve with integrated compensation check valves and a load sense pickup.

These and other objectives are satisfied by an apparatus which includes by a pilot operated control valve that has a body defining an inlet passage and an outlet passage. The control valve also has a main valve poppet for selectively engaging a valve seat within the housing to control flow of fluid between the inlet and outlet passages, and a control chamber on a side of the main valve poppet remote from the valve seat.

The main valve poppet has a pilot passage extending from the outlet passage to an opening into the control chamber. Either the valve body or the main valve poppet has a passageway which extends between the inlet passage and the control chamber. A pilot poppet selectively seals the opening of the pilot passage into the control chamber and a bleeder passage extends through the pilot poppet to provide a fluid path between the control chamber and a cavity on the side of the pilot poppet.

A pressure transducer coupled to the valve body to sense pressure in the cavity. An actuator is operably coupled to move the pilot poppet with respect to the main valve poppet.

In the preferred embodiment of the control valve, the pilot passage is defined by an aperture in the main valve poppet which forms the opening and has an interior end in communication with the inlet passage, and an outlet section extending between the aperture and the outlet passage. A pilot poppet includes a pressure balancing stem which extends into the aperture. The pressure balancing stem has a recess which is acted upon by pressure in the outlet section and has an end which is acted upon by pressure in the inlet section.

Preferably, the control valve also has a load sense inlet in the body and a pressure compensator is located in the body to close fluid communication between the inlet and outlet passages in response to pressure in the load sense inlet exceeding pressure from the inlet passage. A valve mechanism also is provided to communicate the workport pressure to the load sense inlet when that pressure is greater than pressure at the load sense input. This embodiment also may provide a check valve coupled to the body to restrict hydraulic fluid flow from the outlet passage to the inlet passage when the outlet passage has a greater pressure.

Another embodiment also provides a check valve coupled to the body to restrict hydraulic fluid flow from the outlet passage to the inlet passage when pressure at the outlet passage exceeds pressure at the inlet passage.

A hydraulic control valve assembly the incorporates several of these pilot operated control valves to operate a hydraulic actuator also is described.

BRIEF DESCRIPTION OF THE DRAWINGS

FIG. 1 is a solenoid operated pilot supply valve according to the present invention;

FIG. 2 is a solenoid operated drain valve according to the present invention;

DETAILED DESCRIPTION OF THE INVENTION

Figure 3:
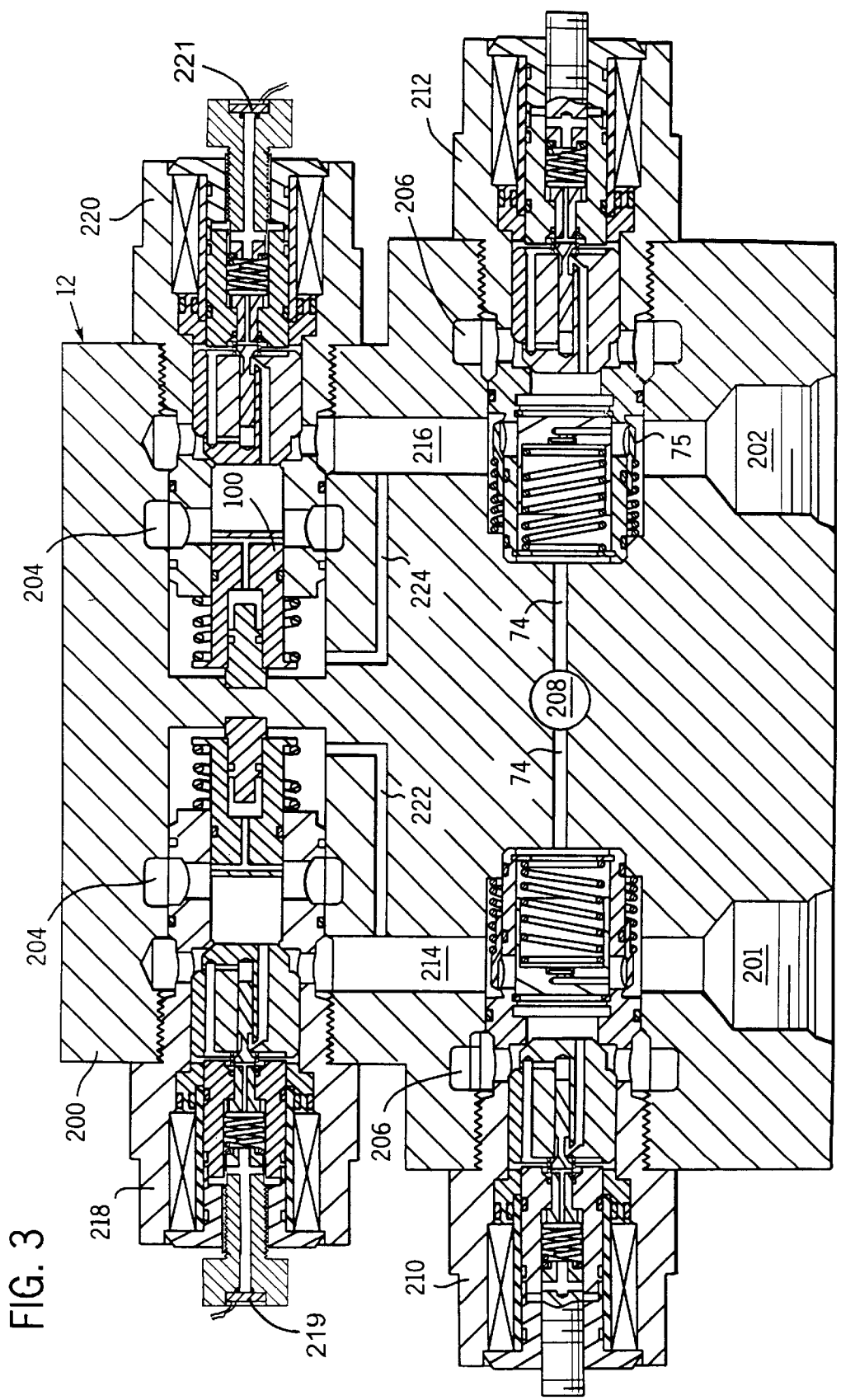
FIG. 3 is a cross-section through a valve assembly incorporating two of the supply valves and two of the drain valves.

With initial reference to FIG. 1, a supply valve 10 is mounted within a hydraulic fluid distribution block 12 and comprises a cylindrical valve body 14 with a longitudinal bore 16 extending therethrough. The valve body 14 has a transverse inlet passage 18 which communicates with the longitudinal bore 16. A transverse outlet passage 20 also extends through the valve body 14 and communicates with the longitudinal bore 16 establishing an intermediate chamber 21 between the inlet and outlet passages 18 and 20. A valve seat 22 is formed where the inlet passage 18 opens into the intermediate chamber 21.

A main valve poppet 24 is slidably positioned within the longitudinal bore 16 and engages the valve seat 22 to selectively control flow of hydraulic fluid between the inlet passage 18 the intermediate chamber 21. The main valve poppet 24 has a pilot passage 30 between the inlet passage 18 and the outlet passage 20 in which the pilot passage 30 is subdivided into an inlet section 26, outlet section 32 and a control chamber 28 of longitudinal bore 16. The inlet section 26 extends from the inlet passage 18 to the control chamber 28 on the remote side of the main valve poppet 24 from the intermediate chamber 21 and the outlet section 32 extends from the control chamber 28 to the intermediate chamber 21. Specifically, the outlet passage opens into the control chamber 28 through a pressure balancing aperture 34 centrally located in the main valve poppet 24.

Movement of the main valve poppet 24 is controlled by a solenoid 36 comprising a solenoid coil 38, armature 42 and a pilot poppet 44. The solenoid coil 38 is received within one end of the longitudinal bore 16 and held in place by an end plate 40 secured to valve body 14. A tube 41 of non-magnetic material is received within the solenoid coil 38 and the tubular armature 42 within the tube projects toward the main valve poppet 24. In response to the electromagnetic field created by energizing solenoid coil 38, the armature 42 slides within the tube 41.

The pilot poppet 44 is located within the bore of the tubular armature 42 and is biased toward one end of the armature by a primary spring 46 that abuts a manual force adjustment screw 48 threaded into an aperture in the end plate 40. In the de-energized state of the solenoid coil 38, the primary spring 46 forces the pilot poppet 44 against a shoulder 50 in the bore of the armature 42 pushing both the armature and the pilot poppet toward the main valve poppet 24. In this state, a frustoconical portion 45 of the pilot poppet 44 abuts the opening of the outlet passage 32 into the control chamber 28, thereby closing communication between the inlet and outlet sections 26 and 32 of the pilot passage 30. A secondary spring 52 biases the main valve poppet 24 away from the armature 42. The pilot poppet 44 has a bleeder passage 54 extending between the control chamber 28 and a cavity, within which the primary spring 46 is located, to allow fluid to flow between the chamber and the cavity.

A pressure balancing stem 56 projects from the pilot poppet 44 into the pressure balancing aperture 34 of the main valve poppet 24. This stem 56 has an annular recess 58 at the interface between the stem and a frustoconical portion 45 of the pilot poppet 44 which seals the pilot passage 30.

The portion of the pressure balancing aperture 34 that is beyond the end of the valve stem 56 has a cross aperture which communicates through the pilot passage inlet section 26 to the inlet passage 18. Therefore, the supply pressure is applied to that end of the pressure balancing stem 56 and the pressure in intermediate chamber 21 is applied to the annular recess 58 at the other end of the pressure balancing stem.

The portion of the supply valve 10 described thus far functions as a proportional valve in response to application of electric current to the solenoid coil 38. The rate of hydraulic fluid flow through the supply valve 10 is directly proportional to the magnitude of electric current passing through the solenoid coil 38. The electric current generates an electromagnetic field which draws the armature 42 into the solenoid coil 38 and away from the main valve poppet 24. Because shoulder 50 of the armature engages a mating surface on the pilot poppet 44, that latter element also moves away from the main valve poppet 24 thereby allowing hydraulic fluid to flow from the inlet passage 18 through the pilot passage inlet section 26, control chamber 28 and the outlet section 32 to the intermediate chamber 21.

Assuming for the moment that the intermediate chamber 21 is in communication with the outlet passage 20 (i.e. check valves 60 and 75 are open), the flow of hydraulic fluid through the pilot passage 30 creates a pressure imbalance between the intermediate chamber 21 and the control chamber 28 which is at a lower pressure. As a consequence of this pressure differential, the main valve poppet 24 will move away from the primary valve seat 22 opening a direct channel between the inlet passage 18 and the outlet passage 20. The movement of the main valve poppet 24 will continue until it contacts the frustoconical portion 45 of the pilot poppet 44. Thus, the distance that the main poppet moves away from the valve seat 22, the size of an opening that is created between the valve inlet and outlet and the flow rate of hydraulic fluid, are determined by the position of the armature 42 and pilot poppet 44. Those parameters are in turn controlled by the magnitude of current flowing through the solenoid coil 38.

The pressure balancing stem 56 of the pilot poppet 44 is positioned in the pilot passage outlet section 32 with the annular recess 58 around the stem in communication with that outlet passage. Thus, under ordinary conditions, the recess 58 is exposed to the outlet pressure and the remote end of the pressure balancing stem 56 is exposed to the pressure at inlet passage 18. Preferably, the effective pressure-responsive area of stem recess 58 and of the stem end surface 35 which is exposed to control pressure is essentially equal to the effective area of the pilot poppet 44 upon which the control pressure acts to urge the pilot toward the main poppet 24. In this way, the pilot poppet 44 will be hydrodynamically balanced so that the only forces acting upon it will be due to primary spring 46 and the solenoid coil 38.

The supply valve 10 contains a pressure compensating mechanism which senses the pressure at each of the workports of the distribution block 12 and provides the greatest of those pressures at a control input of a variable displacement pump that provides pressurized fluid to the distribution block, as will be described. Variable displacement pumps produce an output pressure that is equal to the sum of the pressure applied to the control input plus a constant pressure, known as the "margin." The pressure compensating mechanism causes this margin to be the approximately constant pressure drop across the control valve. This type of pressure compensating system is described in U.S. Pat. No. 5,579,642, the description of which is incorporated herein by reference.

Whereas such previous systems for compensating pressure utilized separate valve mechanisms, the present supply valve 10 incorporates that compensation components into the valve body 14. Specifically, the pressure compensating mechanism 60 is provided at the interior end portion of bore 16 within the valve body 14 as shown in FIG. 1. Here a compensating check valve poppet 61 is biased against a first snap ring 62 by a spring 64 which engages a second snap ring 66 located in a slot at the interior end 68 of the valve body 14. Thus, the compensating check valve poppet 61 is biased toward a closed position where it blocks the flow of hydraulic fluid between the intermediate chamber 21 and the outlet passage 20 of the supply valve 10. The interior end 68 of the valve body 14 has an aperture through which the load sense pressure is applied from passage 74 in the distribution block 12.

In this pressure compensating system, the load sense pressure is the greatest pressure among all of the associated workports and thus is applied to the spring side of the pressure compensating valve poppet 61 to urge the poppet into the closed state. The opposite side of the poppet receives the supply pressure as applied at the intermediate chamber 21 when the supply valve 10 is open. When the pressure at another workport of the valve assembly is significantly greater than that at the workport associated with this particular supply valve 10, the pressure compensating check valve poppet 61 will be forced closed. Otherwise the pressure compensating check valve poppet 61 will be open to a degree which is a function of the difference between those pressures.

The workport pressure is sensed by a load sense valve 70 located in a passage through the compensating check valve poppet 61. The flat load sense valve 70 is held in place by a disk 72 with apertures therethrough that is held against the compensating check valve poppet 61 by spring 64. As a result, if the workport pressure for this particular valve is the greatest among all of the workports for the distribution block 12, the load sense valve 70 will open transmitting that workport pressure to the load sense passage 74. When another workport has the greatest pressure, the pressure within the load sense passage 74 will be greater than that at the output passage 20 of the valve and the load sense valve 70 will be in the closed position.

The supply valve 10 also has a check valve 75 to prevent hydraulic fluid from flowing backwards from the workport through the supply valve in an open state. Such a backward flow could occur if the device being supplied from the valve 10 is operating a very large load, which forces fluid backward to the supply valve. This check valve 75 is implemented by a sleeve 76 around the outside of the valve body 14 and biased by a spring 78 over the outlet passage 20. The respective surfaces of the sleeve 76 which are exposed to the workport pressure and the pressure from intermediate chamber 21 are sized so that the check valve 75 will open when the intermediate chamber pressure is greater and close off the outlet passage 20 when the workport pressure is greater.

With reference to FIG. 2, a return valve 90 has a solenoid operated valve 92 which is similar to that described with respect to the supply valve 10. In this return valve 90, a main valve poppet 94 opens and closes a passageway between a workport inlet 96 and a return port 98. The main valve poppet 94 is controlled by a pilot poppet 95 which is biased closed by a primary spring 91. The force of the primary spring 91 is set manually by an adjustment screw 93 threaded into an aperture in the end plate 89.

The force adjustment screw 93 has a passage 99 there through and a pressure sensing transducer 97 is sealed within the outer opening of that passage. The pressure at workport inlet 96 is communicated to the transducer 97 through the inlet section 85 of pilot passage 86 in the main valve poppet 94, the pilot poppet bleeder passage 88 and the force adjustment screw passage 99. This enabled the transducer 97 to sense the workport pressure even in the closed state of the return valve 90. By integrating the pressure sensing transducer 97 into the structure of the return valve 90, an additional port in the hydraulic fluid distribution block 12 is not required for pressure sensing.

Return valve 90 does not have the pressure compensating check valve assembly nor the load sense valve and separate check valve which were provided in the outlet region of the supply valve 10. Instead, the relief valve has an internal check valve 100 located in the workport region of the return valve 90. The internal check valve 100 has a poppet 102 that is biased away from the end of the valve body 101 by a spring 104. The check valve poppet 102 has a central aperture 105 which receives a guide pin that extends from the bottom of the hole in the distribution block 12 in which the return valve 90 resides. A cavity 112 between the end of the return valve 90 and the bottom of the distribution block hole is connected by a channel 108 to passage 110 that leads to a workport of the distribution block 12. Therefore, the cavity 112 receives the workport pressure which tends to move the internal check valve 100 in an inward direction with respect to the valve body 101 thereby tending to close off the return port 98.

With reference to FIG. 3, a section 200 of the fluid distribution block 12 has two workports 201 and 202 for coupling to a bidirectional actuator, such as different chambers of a hydraulic cylinder for example. The section 200 may be one of several sections which are stacked together one on top of another to form the fluid distribution block 12 for operating a plurality of actuators. As such, section 200 has two tank channels 204 running therethrough (into and out of the plane of FIG. 3), and a pair of supply channels 206 running into parallel to the tank channels. The tank and supply channels 204 and 206 are connected by external hoses (not shown) to the reservoir tank and pump, respectively. A similar load sense channel 208 is provided through section 200 of the distribution block 12.

Each workport 202 and 204 has an associated supply valve 210 and 212 respectively to control the flow of fluid between one of the pump passages 206 and the corresponding workport. Each supply valves 210 and 212 is of the type described above and shown in FIG. 1. Load sense channel 208 communicates with the internal end of each of the supply valves 210 and 212. The distribution block section 200 also has cross channels 214 and 216 that extend from one workport 201 and 202 respectively to the input passages of separate return valves 218 and 220 of the type shown in FIG. 2 with pressure sensing transducers 219 and 221, respectively. The internal end of each return valve 218 and 220 are coupled via a passageway 222 and 224 respectively to the associated workport cross channel 214 or 216. Thus, the workport pressure is applied to the corresponding check valve 100 at the internal end of the return valves 218 and 220.

Figure 4:
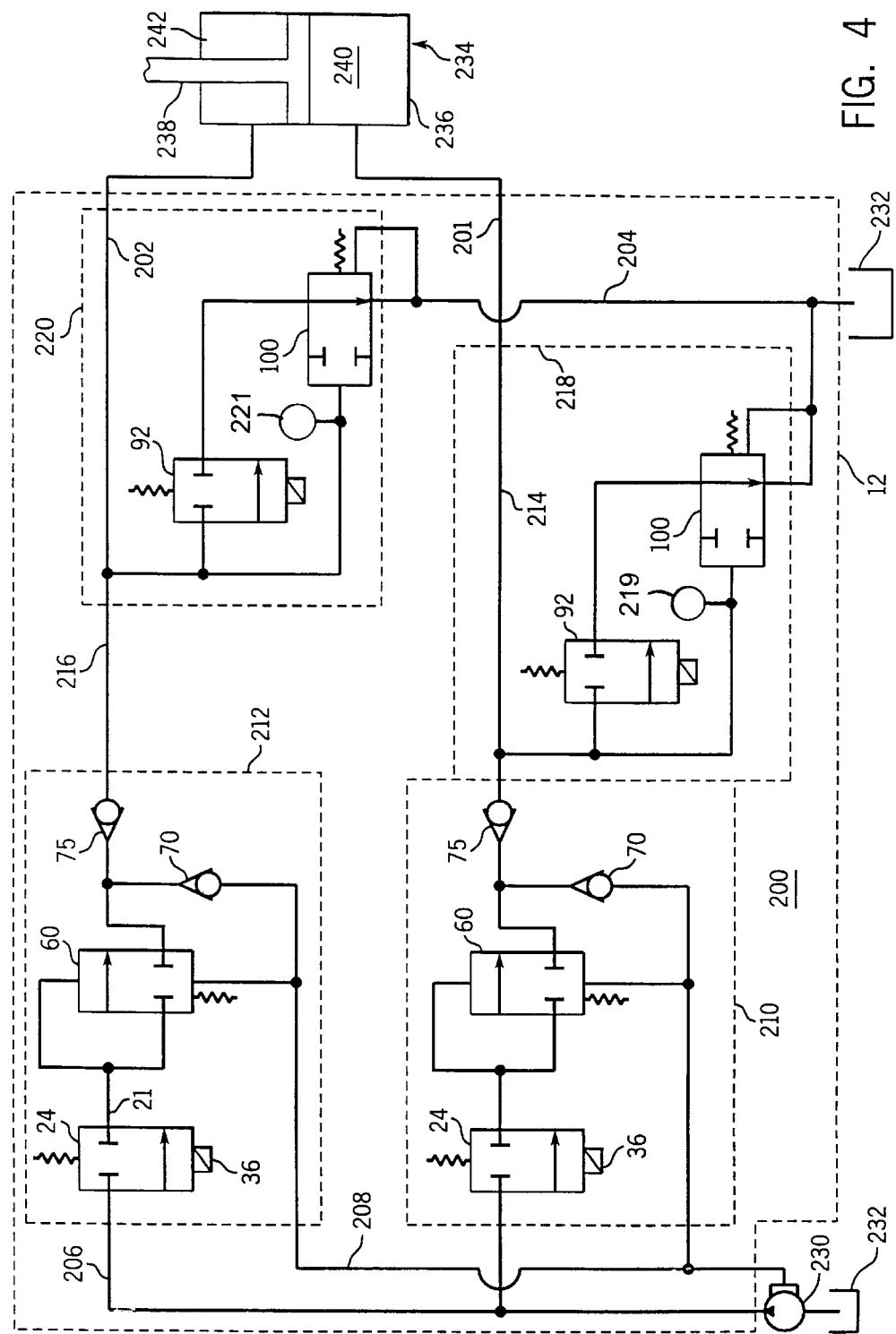
FIG. 4 is a schematic diagram of the valve assembly of FIG. 3 incorporated into a hydraulic control system.

FIG. 4 schematically illustrates the connection of the different valves within a section 200 of fluid distribution block 12 and connection of a variable displacement pump 230, a reservoir tank 232 and an hydraulic actuator 234. The hydraulic actuator 234 is shown as comprising a cylinder 236 that is divided into two internal chambers 240 and 242 by a piston 238.

In order to raise the piston 238, a control circuit (not shown) energizes the solenoid 36 within the supply valve 210 which causes hydraulic fluid from pump 230 to flow to the integral compensating check valve 60 within supply valve 210. The application of pressure from the solenoid supply valve opens the compensating check valve 60 enabling the hydraulic fluid to flow through the check valve 75. The hydraulic fluid then flows out the workport 201 to the lower cylinder chamber 240 and tends to push the piston 238 upward.

At this time the return valve 218 for the cylinder's lower chamber 240 is de-energized with the primary spring 91 (FIG. 2) keeping that valve closed. In addition, the relatively high pump pressure in the cross channel 214, as compared to the tank channel 204, forces check valve 100 of the return valve 218 closed. In case the return valve 218 inadvertently opens, its check valve 100 prevents the output flow from the supply valve 210 from going through the return valve 218 to the tank 232.

The resultant upward force on the piston 238, from introduction of fluid into the lower cylinder chamber 240, compresses the fluid present in the upper chamber 242 which would otherwise impede the upward movement of the piston. However, at this time a signal from the control circuit activates the solenoid in the return valve 220 for the cylinder's upper chamber 242 which opens the return valve. Thus, the hydraulic fluid from the upper chamber 242 flows through the return valve 220 to the tank 232. Because the pressure differential between the cross channel 216 and the tank channel 204 is not sufficient to overcome the force of spring 225, the check valve 100 for the return valve 220 is biased open.

The pressure of the return fluid from cylinder upper chamber 242 closes the check valve 75 of supply valve 212, thereby inhibiting the return pressure from affecting the load sense valve 70 in that supply valve and operation of pump 230.

If the load exerted on piston 238 becomes greater than the pump pressure, the piston would tend to force hydraulic fluid out of the lower cylinder chamber 240 backwards through the valve section 200 toward the pump 230. The check valve 75 in the supply valve 210 closes in response to this reverse pressure, thereby restricting the backward flow of hydraulic fluid from the actuator 234. The location of that check valve 75 also prevents the reverse pressure from affecting the load sensing within the supply valve 210. Such high pressure within the lower cylinder chamber 240 also closes the check valve 100 within return valve 218 so that fluid cannot drain to the tank 232 should the associated solenoid valve 92 open. Therefore, the valve assembly inhibits a heavy load from forcing the actuator downward.

It will be understood that to move the piston 238 downward within cylinder 236, the control circuit will energize the solenoids in supply valve 212 and return valve 218 while maintaining the solenoids in valves 210 and 220 de-energized. This alternative action supplies hydraulic fluid from pump 230 to the upper chamber 242 of cylinder 236 while draining fluid from the lower chamber 240 to tank 232.

What is claimed is:

1. In a pilot operated control valve having a body defining an inlet passage and an outlet passage, a main valve poppet selectively engaging a valve seat of the body to control flow of fluid between the inlet and outlet passages, and a control chamber on a side of the main valve poppet remote from the valve seat, an improvement characterized by:

the main valve poppet having a pilot passage provides a fluid path between the outlet passage and an opening into the control chamber;

one of the body and the main valve poppet having a passageway extending between the inlet passage and the control chamber;

a pilot poppet which selectively seals the opening of the pilot passage into the control chamber, and having a bleeder passage extending between the control chamber and a cavity on a side of the pilot poppet that is remote from the control chamber;

a pressure transducer coupled to the body to sense pressure in the cavity; and an actuator operably coupled to move the pilot poppet with respect to the main valve poppet.

2. The pilot operated control valve as recited in claim 1 wherein:

the pilot passage of the main valve poppet includes a section that extends from the control chamber and has an interior portion that communicates with the inlet passage; and the pilot poppet has a pressure balancing stem which projects into the section of the pilot passage.

3. The pilot operated control valve as recited in claim 1 wherein the actuator is a solenoid with an armature that produces movement of the pilot poppet.

4. The pilot operated control valve as recited in claim 1 wherein the actuator is a solenoid comprising:

an electromagnetic coil;

a tubular armature within the electromagnetic coil with the pilot poppet received within the armature; and a spring biasing the pilot poppet against the armature.

5. The pilot operated control valve as recited in claim 1 wherein the body also has a load sense inlet; and further comprising a pressure compensator with in the body and closing fluid communication between the inlet and outlet passages in response to pressure in the load sense inlet exceeding pressure from the inlet passage.

6. The pilot operated control valve as recited in claim 5 further comprising a spring which biases the pressure compensator toward a position wherein fluid communication between the inlet and outlet passages is closed.

7. The pilot operated control valve as recited in claim 5 further comprising a load sense passage extending between the load sense inlet and the outlet passage, and a valve which closes the load sense passage when pressure at the load sense inlet is greater than pressure at the outlet passage.

8. The pilot operated control valve as recited in claim 1 further comprising the body having a load sense inlet, and a compensating check valve poppet within the body and closing fluid communication between the inlet and outlet passages in response to pressure in the load sense inlet exceeding pressure from the inlet passage.

9. The pilot operated control valve as recited in claim 8 further comprising a load sense passage extending within the compensating check valve poppet between the load sense inlet and the outlet passage; and a valve which closes the load sense passage when pressure at the load sense inlet is greater than pressure at the outlet passage.

10. The pilot operated control valve as recited in claim 1 further comprising a check valve coupled to the body to restrict hydraulic fluid flow from the outlet passage to the inlet passage.

11. The pilot operated control valve as recited in claim 1 further comprising a check valve sleeve around the body which closes the outlet passage to restrict hydraulic fluid flow from the outlet passage to the inlet passage.

12. The pilot operated control valve as recited in claim 1 further comprising a check valve within the body and closing fluid communication between the inlet and outlet passages in response to an external force acting on the check valve.

13. The pilot operated control valve as recited in claim 1 further comprising a check valve poppet within the body and closing fluid communication between the inlet and outlet passages in response to external pressure acting on the check valve being greater than pressure at the outlet passage.

14. The pilot operated control valve as recited in claim 13 further comprising a spring which biases the check valve poppet into a position which allows fluid communication between the inlet and outlet passages.

15. A hydraulic control valve assembly comprising:

a distribution block having a pump supply passage, a tank passage, a load sense passage, a first workport and a second workport;

first and second pilot operated supply valves each including:

(a) a first body defining a first inlet and a first outlet with a first valve seat therebetween, (b) a first main valve poppet selectively engaging the first valve seat to control flow of fluid between the first inlet and the first outlet, and forming a first control chamber within the first body on a side remote of the first main valve poppet from the first valve seat, (c) a first aperture in the first main valve poppet with an opening into the first control chamber, the first aperture having an interior end in fluid communication with the first inlet, (d) a first pilot passage formed in the first main valve poppet, and comprising an first inlet section extending between the first inlet and the first control chamber, and comprising a first outlet section providing a fluid path between the first aperture and the first control chamber, (e) a first pilot poppet which selectively seals the opening of the first aperture, and having a first pressure balancing stem projecting into the first aperture, the first pressure balancing stem having a first recess which is acted upon by pressure from the first outlet section and having an end which is acted upon by pressure from the first inlet section, (f) a pressure compensator with in the first body in communication with the load sense passage and closing fluid communication between the first inlet and first outlet in response to pressure in the load sense passage exceeding pressure from the first inlet, and (g) a first actuator operably coupled to move the first pilot poppet, wherein the first pilot operated supply valve is mounted in the distribution block with its first inlet in communication with the pump supply passage and its first outlet in communication with the first workport, and the second pilot operated supply valve is mounted in the distribution block with its first inlet in communication with the pump supply passage and its first outlet in communication with the second workport; and first and second pilot operated return valves each including:

(h) a second body defining a second inlet and a second outlet with a second valve seat therebetween, (i) a second main valve poppet selectively engaging the second valve seat to control flow of fluid between the second inlet and the second outlet, and forming a second control chamber within the second body on a side remote of the second main valve poppet from the second valve seat, (j) a second aperture in the second main valve poppet with an opening into the second control chamber, the second aperture having an interior end in fluid communication with the second inlet, (k) a second pilot passage formed in the second main valve poppet, and comprising a second inlet section extending between the second inlet and the second control chamber and comprising a second outlet section providing a fluid path between the second aperture and the second outlet, (l) a second pilot poppet which selectively seals the opening of the second aperture, and having a second pressure balancing stem projecting into the second aperture, the second pressure balancing stem having a recess which is acted upon by pressure from the second outlet section and having an end which is acted upon by pressure from the second inlet section, and the second pilot poppet including a bleeder passage extends from the second control chamber to a cavity on a remote side of the second body of the second pilot poppet;

(m) a pressure transducer coupled to the second body to sense pressure in the cavity, (n) a check valve coupled to the second body to restrict hydraulic fluid flow from the second outlet to the second inlet when pressure at one of the first and second the workports exceeds pressure at the tank passage, and (o) a second actuator operably coupled to move the second pilot poppet, wherein the first pilot operated return valve is mounted in the distribution block with its second inlet in communication with the first workport and its second outlet in communication with the tank passage, and the second pilot operated control valve is mounted in the distribution block with its second inlet in communication with the second workport and its second outlet in communication with the tank passage.

16. The hydraulic control valve assembly as recited in claim 15 wherein the pressure compensator comprises a compensating check valve poppet within the first body and having a load sense channel extending between the load sense passage and the first outlet, and a valve which closes the load sense channel when pressure at the load sense passage is greater than pressure at the first outlet.

* * * * *